United States Patent Office 2,881,169
Patented Apr. 7, 1959

2,881,169

RUBBER ACCELERATORS

David J. Whittingham, Montreal, Quebec, and Arthur F. McKay, Beaconsfield, Quebec, Canada, assignors to Monsanto Canada Limited, La Salle, Quebec, Canada No Drawing. Application March 21, 1958
Serial No. 722,852

9 Claims. (Cl. 260—243)

The present invention relates to 2-(carboxyalkylamino)-$\Delta^2$-1,3-diazacycloalkenes, to a process of preparing these compounds and to new intermediate products resulting from this process.

The diazacycloalkenes of the invention have the following general formula

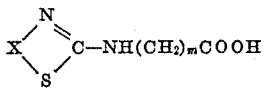

wherein X is selected from the group consisting of $CH_2$–$CH_2$ and $CH_2$–$CH_2$–$CH_2$ and $m$ is an integer from 1 to 10.

The new diazacycloalkenes are prepared by heating an $\omega$-amino acid, for example one selected from the group consisting of glycine, $\beta$-alanine, $\epsilon$-aminocaproic and $\omega$-aminoundecanoic acid, with a free base selected from the group consisting of 2-methylmercapto-2-thiazoline and 2-methylmercapto $\Delta^2$-dihydro-1,3-thiazine in the presence of an inert solvent, for example, a solvent selected from the group consisting of methanol, ethanol, benzene and carbon tetrachloride until the evolution of methyl mercaptan practically ceases. The resulting products, which are solids, may be isolated and purified by known procedures used in dealing with solid products, for example filtration or centrifugation.

If the hydroiodide or hydrochlorides of 2-methylmercapto-2-thiazoline and 2-methylmercapto-$\Delta^2$-dihydro-1,3-thiazine are used in the above reaction, the yields of the desired products of general Formula I above are much lower. The applicants thus prefer to use the free bases of the 2-methylmercapto compounds in the process for producing the 2-carboxylakylamino-derivatives of 2-thiazoline and $\Delta^2$-dihydro-1,3-thiazine.

The zinc salts of the acids of the above general Formula I may be prepared by adding a soluble zinc salt, for example zinc chloride, zinc acetate or zinc sulfate to the aqueous solution of the sodium or potassium salt of the acids of the general Formula I. The zinc salts of some of the acids of Formula I are water-soluble and the solutions must be concentrated to small volumes to obtain the salts. On the other hand the corresponding silver salts are quite insoluble and they may be recovered by simple filtration.

The 2-(carboxyalkylamino)-$\Delta^2$-1,3 - diazacycloalkenes, of the invention are useful as rubber accelerators. For this use, they are preferably admixed with from about 1 to about 5% of their corresponding metal salts, for example, the zinc or manganese salts, and from about 1 to about 3% of a dispersing oil. These amounts are by weight. The metal salts of compounds of the above general formula are activators for the accelerators.

EXAMPLE I

*2-(carboxymethylamino)-2-thiazoline*

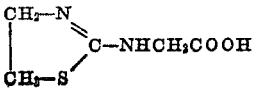

A solution of 16 parts by weight of 2-methylmercapto-2-thiazoline and 9 parts of glycine in 79 parts of methanol and 100 parts of water was heated under reflux for eighteen hours. Upon being cooled to room temperature, the reaction mixture afforded 13 parts by weight of a white solid, which was collected by filtration and dried, M.P. 219–220° C. (dec.) A further quantity of product (3 parts) of the same melting point was obtained by working up the mother liquor from the first crop. The total yield of crude 2-(carboxymethylamino)-2-thiazoline was thus 16 parts by weight. Crystallization of the crude product from water raised the melting point to a constant value of 224–225° C. (dec.). Analysis of the new compound gave 37.48% carbon, 5.09% hydrogen, 17.78% nitrogen and 20.20% sulfur, compared with the theoretical calculated for $C_5H_8N_2O_2S$ of 37.49% carbon, 5.03% hydrogen, 17.49% nitrogen and 20.01% sulfur.

Its picrate salt prepared in the usual manner melted at 195–196° C. Analysis of this compound gave 34.18% carbon, 3.1% hydrogen, 17.66% nitrogen and 8.33% sulfur, compared with the theoretical calculated for $C_{11}H_{11}N_5O_9S$ of 33.94% carbon, 2.85% hydrogen, 17.99% nitrogen and 8.24% sulfur.

EXAMPLE II

*2-($\beta$-carboxyethylamino)-2-thiazoline*

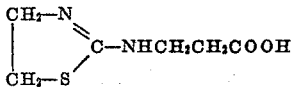

A solution of 84 parts by weight of 2-methylmercapto-2-thiazoline and 56 parts of $\beta$-alanine in 396 parts of methanol and 500 parts of water was heated under reflux for twenty-five hours. After removal of the methanol and water in vacuo under nitrogen, 125 parts of a colorless semi-crystalline residue remained. This crude product was dissolved in 150 parts of water, and the solution was diluted with 198 parts of acetone until turbidity appeared. The product separated as an oil, which crystallized slowly on standing in the cold. In this fashion the first crop of crystals (85 parts) was obtained, M.P. 193–194° C. (dec.). When the mother liquor from the first crop was concentrated to one-eighth of its original volume and then diluted with 79 parts of acetone, a second crop of crystals (4 parts) of the same melting point was obtained. The total yield of crude 2-($\beta$-carboxyethylamino)-2-thiazoline was thus 89 parts by weight. Crystallization of the crude product from acetone-water (2.4:1) raised the melting point to a constant value of 198–199° C. (dec.). Analysis of the new compound gave 41.14% carbon, 5.72% hydrogen, 16.20% nitrogen and 18.55% sulfur, compared with the theoretical calculated for $C_6H_{10}N_2O_2S$ of 41.36% carbon, 5.79% hydrogen, 16.09% nitrogen and 18.40% sulfur.

Its picrate salt prepared in the usual manner melted at 177.5–179° C. Analysis of this compound gave 35.74% carbon, 3.32% hydrogen, 17.40% nitrogen and 8.00% sulfur, compared with the theoretical calculated for $C_{12}H_{13}N_5O_9S$ of 35.73% carbon, 3.25% hydrogen, 17.37% nitrogen and 7.95% sulfur.

EXAMPLE III

*2-($\epsilon$-carboxypentylamino)-2-thiazoline*

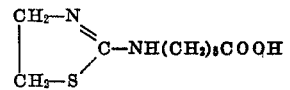

A solution of 8.4 parts by weight of 2-methylmercapto-2-thiazoline and 8.3 parts of aminocaproic acid in 39.6 parts of methanol and 50 parts of water was heated under reflux for twenty-four hours. After removal of the methanol and water in vacuo, the white solid residue was crystallized from 40 parts of acetonemethanol (1:1). The yield of 2-(ε-carboxypentylamino)-2-thiazoline was 12 parts by weight, M.P. 122–124° C. Further recrystallization of the product from acetone-water (5.9:1) raised the melting point to a constant value of 126–127° C. Analysis of the new compound gave 50.19% carbon, 7.75% hydrogen, 12.88% nitrogen and 14.42% sulfur, compared with the theoretical calculated for $C_9H_{16}N_2O_2S$ of 49.97% carbon, 7.45% hydrogen, 12.95% nitrogen and 14.82% sulfur.

Its picrate salt prepared in the usual manner melted at 167–168° C. Analysis of this compound gave 40.44% carbon, 4.43% hydrogen, 15.67% nitrogen, and 7.30% sulfur, compared with the theoretical calculated for $C_{15}H_{19}N_5O_9S$ of 40.45% carbon, 4.30% hydrogen, 15.72% nitrogen and 7.20% sulfur.

EXAMPLE IV 2-(ε-carboxypentylamino)-Δ²-dihydro-1,3-thiazine

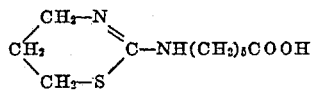

A solution of 8.7 parts by weight of 2-methylmercapto-Δ²-dihydro-1,3-thiazine and 7.8 parts of ε-aminocaproic acid in 59.5 parts of methanol and 75 parts of water was heated under reflux for thirty hours. After removal of the methanol and water in vacuo, the residue was dissolved in 20 parts of methanol, and the solution was diluted with 32 parts of acetone until turbidity appeared. Upon cooling for two days this solution deposited 12.5 parts of crystalline product, M.P. 174–176° C. A second crop of crystals (0.4 part) was obtained on working up the mother liquor from the first crop. The total yield of 2-(ε-carboxypentylamino)-Δ²-dihydro-1,3-thiazine was thus 12.9 parts by weight. Recrystallization of the product from acetone-water (4.8:1) raised the melting point to a constant value of 181–182° C. Analysis of this new compound gave 51.67% carbon, 7.88% hydrogen, 12.16% nitrogen and 13.92% sulfur, compared with the theoretical calculated for $C_{10}H_{18}N_2O_2S$ of 52.14% carbon, 7.88% hydrogen, 12.16% nitrogen and 13.92% sulfur.

Its picrate salt prepared in the usual manner melted at 161–163° C. Analysis of this compound gave 41.85% carbon, 4.69% hydrogen, 14.94% nitrogen, and 7.10% sulfur, compared with the theoretical calculated for $C_{16}H_{21}N_5O_9S$ of 41.83% carbon, 4.61% hydrogen, 15.25% nitrogen and 6.98% sulfur.

EXAMPLE V 2-(10-carboxydecylamino)-2-thiazoline

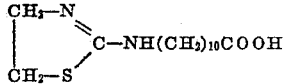

A solution of 4.1 parts by weight of 2-methylmercapto-2-thiazoline and 6.1 parts of 11-aminoundecanoic acid in 20 parts of methanol and 15 parts of water was heated under reflux for five hours. Upon being cooled to room temperature the reaction mixture deposited a white solid, which was collected by filtration. The filtrate yielded a further quantity of product upon evaporation. The crude 2-(10-carboxydecylamino)-2-thiazoline melted at 79–81° C. Crystallization from a methanol-water mixture raised the melting point to a constant value of 114–115° C. Analysis of this new compound gave 58.41% carbon, 9.20% hydrogen, 10.03% nitrogen and 11.13% sulfur, compared with the theoretical calculated for $C_{14}H_{26}N_2O_2S$ of 58.70% carbon, 9.15% hydrogen, 9.78% nitrogen and 11.19% sulfur.

Its picrate salt prepared in the usual manner and crystallized from benzene melted at 127–128° C. Analysis of this compound gave 46.54% carbon, 5.92% hydrogen, 13.72% nitrogen and 5.95% sulfur, compared with the theroretical calculated for $C_{20}H_{29}N_5O_9S$ of 46.59% carbon, 5.67% hydrogen, 13.59% nitrogen and 6.22% sulfur.

We claim:

1. A 2-(carboxyalkylamino)-Δ²-1,3-diazacycloalkene of the general formula

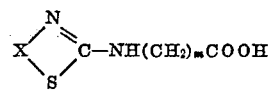

in which X is selected from the group consisting of $CH_2-CH_2$ and $CH_2-CH_2-CH_2$ and $m$ is an integer from 1 to 10, and its metallic salts of a metal selected from the group consisting of manganese and zinc.

2. A compound of the following general formula in which $m$ is from 1 to 10.

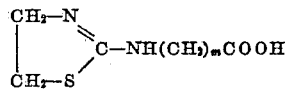

3. A compound of the following general formula in which $m$ is from 1 to 10.

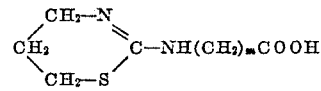

4. 2-(carboxymethylamino)-2-thiazoline.
5. 2-(β-carboxyethylamino)-2-thiazoline.
6. 2-(ε-carboxypentylamino)-2-thiazoline.
7. 2 - (ε - carboxypentylamino) - Δ² - dihydro - 1,3-thiazine.
8. 2-(10-carboxydecylamino)-2-thiazoline.
9. A process for preparing a compound of the general formula

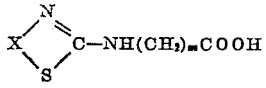

wherein X is selected from the group consisting of $CH_2-CH_2$ and $CH_2-CH_2-CH_2$ and $m$ is an integer from 1 to 10, comprising heating an ω-amino aliphatic acid of the general formula $NH_2(CH_2)_m COOH$ in which $m$ is as above with a free base selected from the group consisting of 2-methylmercapto-2-thiazoline and 2-methylmercapto-Δ²-dihydro-1,3-thiazine in the presence of an insert solvent until the evolution of methyl mercaptan practically ceases, and isolating the resulting diazacycloalkene formed.

No references cited.

UNITED STATES PATENT OFFICE
CERTIFICATE OF CORRECTION

Patent No. 2,881,169                                              April 7, 1959

David J. Whittingham et al.

It is hereby certified that error appears in the printed specification of the above numbered patent requiring correction and that the said Letters Patent should read as corrected below.

Column 1, lines 15, 18, 27 and 58, for "diazacycloalkenes", each occurrence, read -- thiazacycloalkenes --; same column 1, line 46, for "2-carboxylakylamino-derivatives" read -- 2-carboxyalkylamino-derivatives --; column 4, line 14, for "theroretical" read -- theoretical --; lines 18, 61 and 62, for "diazacycloalkene", each occurrence, read -- thiazacycloalkene --.

Signed and sealed this 3rd day of May 1960.

(SEAL)
Attest:

KARL H. AXLINE                                               ROBERT C. WATSON

Attesting Officer                                           Commissioner of Patents